United States Patent [19]

DesMarais

[11] 4,067,832

[45] Jan. 10, 1978

[54] FLEXIBLE POLYURETHANE FOAM

[75] Inventor: Thomas Allen DesMarais, Cincinnati, Ohio

[73] Assignee: The Procter & Gamble Company, Cincinnati, Ohio

[21] Appl. No.: 662,304

[22] Filed: Mar. 1, 1976

[51] Int. Cl.² .............................................. C08G 18/24
[52] U.S. Cl. ......................... 260/2.5 AB; 260/2.5 AT; 260/2.5 BB; 260/77.5 AT; 260/77.5 AB
[58] Field of Search .................... 260/2.5 AT, 2.5 AB, 260/2.5 BB, 77.5 AB, 77.5 AT

[56] References Cited

U.S. PATENT DOCUMENTS

| | | | |
|---|---|---|---|
| 3,108,975 | 10/1963 | Lambert et al. | 260/2.5 AB |
| 3,437,609 | 4/1969 | Bayer et al. | 260/2.5 AT |
| 3,772,218 | 11/1973 | Lamplugh et al. | 260/2.5 BB |
| 3,925,319 | 12/1975 | Hiatt et al. | 260/2.5 AT |
| 3,945,981 | 3/1976 | Robertson | 260/77.5 AB |

FOREIGN PATENT DOCUMENTS

| | | | |
|---|---|---|---|
| 416,687 | 11/1967 | Australia. | |
| 891,007 | 3/1962 | United Kingdom | 260/2.5 AB |

Primary Examiner—Eugene C. Rzucidlo
Attorney, Agent, or Firm—Monte D. Witte; Fredrick H. Braun; John V. Gorman

[57] ABSTRACT

Flexible, light-stable polyurethane foam. Aliphatic diisocyanates are reacted with polyether polyols and polyfunctional cross-linking agents in the presence of water, a metal catalyst and a strong base catalyst. The polyether polyols must have an equivalent weight of at least 2,000 while the cross-linking agent must have at least three primary hydroxyl groups and have an equivalent weight of less than 100. The strong base catalyst must be present at from about $3.8 \times 10^{-4}$ to about $1.25 \times 10^{-3}$ equivalents per 100 parts polyether polyol.

8 Claims, No Drawings

FLEXIBLE POLYURETHANE FOAM

BACKGROUND OF THE INVENTION

1. Field of the Invention

This invention relates to flexible polyurethane foams made from aliphatic isocynanates and polyether polyols.

2. Description of the Prior Art

Flexible polyurethane foams are well-known materials having a variety of uses. A large body of information relating to the preparation of flexible polyurethane foams has been published in recent years. For example, Windemuth in U.S. Pat. No. 2,948,691 issued on Aug. 9, 1960 teaches that flexible polyurethane foams can be made from mixtures comprising aliphatic or aromatic isocyanates and polyols. Britain in U.S. Pat. No. 3,397,158 issued Aug. 13, 1968 and Hostettler in U.S. Pat. No. 3,398,106 issued Aug. 20, 1968 both describe an improvement in flexible polyurethane foam making processes through the use of stannous octoate catalyst.

Although there is some mention of aliphatic isocyanates, most of the information in the prior art relates to the use of aromatic diisocyanates, particularly tolylene diisocyanates, in making flexible polyurethanes. While flexible polyurethane foams having excellent physical properties can be prepared from aromatic isocyanates, they generally discolor on exposure to light. This discoloration is particularly undesirable in applications where aesthetic qualities of the foams are important. Wilson, in Australian patent application 416,687 published Nov. 30, 1967 describes a process for making flexible polyurethane foams having increased color stability. He suggests reacting polyester or polyether polyols having a molecular weight greater than 1,000 and hydroxyl numbers between 37 and 112 with aliphatic diisocyanates in the presence of polyfunctional hydroxyl compounds having at least three hydroxyl groups. Water, a metal catalyst, and, optionally, a basic amine catalyst are also required in the reaction mixture. While the process taught by Wilson represents an improvement over the prior art, the flexible polyurethane foams produced thereby still suffer from excessive surface tackiness, difficulties in manufacture because of long reaction times, and, in some embodiments, friability. These problems can be overcome through the use of the invention herein described.

SUMMARY OF THE INVENTION

Flexible polyurethane foams having enhanced color stability, excellent flexibility, and freedom from surface tackiness can be prepared by the one-shot process from a reaction mixture comprising a polyether polyol, an aliphatic diisocyanate, a polyfunctional cross-linking agent, stannous octoate catalyst, a strong base catalyst and water.

DETAILED DESCRIPTION OF THE INVENTION

Flexible, color-stable, non-tacky, easily made polyurethane foams result from the practice of this invention. The foams are prepared by the one-shot foam-making process well known to those skilled in the art. This process is described, for example, in Saunders and Frisch, *Polyurethanes Chemistry and Technology, Part II. Technology*, Volume XVI of the series "High Polymers" (Interscience Publishers, New York, 1964) beginning at page 75, which is herein incorporated by reference. In the one-shot process, all the components are metered into a mixing head where they are violently agitated for a predetermined time, typically 1 to 4 seconds. The mixture is then discharged into a mold or onto a conveyor belt where it is allowed to expand and begin the curing reaction. The time required for the discharged mixture to exhibit an increase in viscosity indicating the initiation of the polymerization reaction is known as the cream time. The time elapsed between the initial mixing of the components and the time at which the flexible polyurethane foam reaches its maximum volume is known as the rise time. For most applications a maximum cream time of 20 seconds and a maximum rise time of 2 minutes are desirable. When the foamed polyurethane has cured sufficiently to allow convenient handling, typically after 15 to 60 minutes at room temperature, it is reticulated by being passed between two rolls which compress the foam mass and rupture many internal cell walls. Following reticulation, the foam is optionally allowed to cure for an indefinite period of time at room temperature prior to conversion into an end product.

The flexible polyurethane foam of this invention is made from aliphatic diisocyanates, polyether polyols, polyfunctional cross-linking agents, water, metal catalysts, strong bases, and, optionally, foam stabilizers. Each of these materials is described more fullly in the paragraphs which follow. The compositions used throughout this specification are expressed as parts by weight per 100 parts by weight polyether polyol.

As used herein the term aliphatic diisocyanate is used to describe a molecule in which the organic moiety separating the two nitrogens of the terminal isocyanate groups is terminated by saturated carbon atoms. That is to say, the nitrogen atom of the isocyanate moiety is not directly attached to an aromatic ring. Thus, the term aliphatic diisocyanate as used herein does encompass diisocyanates containing aromatic rings, but the isocyanate groups can not be attached directly to the aromatic rings. Typical aliphatic diisocyanates useful in the present invention incude: hexamethylene diisocyanate, tetramethylene diisocyanate, isophorone diisocyanate, (2,2,4) and (2,4,4) trimethylhexamethylene diisocyanate, and 4, 4'- methylene bis(cyclohexyl isocyanate). The preferred aliphatic diisocyanate for use in the present invention is hexamethylene diisocyanate, hereinafter HDI.

The amount of aliphatic diisocyanate present in the reaction mixture is selected so that the Isocyanate Index is less than 110. Isocyanate Index is defined as 100 times the ratio of isocyanate equivalents to hydroxyl equivalents in the reaction mixture. The number of isocyanate equivalents in any given quantity of reaction mixture is obtained by dividing the weight of aliphatic diisocyanate present by its equivalent weight. (The equivalent weight of a diisocyanate is, of course, one half its molecular weight.) Similarly, the number of hydroxyl equivalents present in any given quantity of reaction mixture is obtained by dividing the weight of each hydroxy-containing component by its equivalent weight and obtaining the sum of these quotients. For the purpose of computing the Isocyanate Index, water is considered to be equivalent to a diol. That is to say, the equivalent weight of water is considered to be 9. This anomaly results because of the well known reaction sequence wherein one molecule of water precipitates the reaction of two isocyanate groups to yield a urea compound accompanied by the evolution of carbon dioxide.

It has been surprisingly discovered that when the Isocyanate Index exceeds 110, the reactions taking place within the mixture of the components are exothermic to such a degree that scorching or burning of the resulting polyurethane foam occurs.

When the preferred aliphatic diisocyanate, HDI, is used, and all other components are within their critical ranges, the preferred concentration of HDI is from about 35 to about 40 parts per 100 parts polyether polyol.

The polyols used in the instant invention are polyether compounds having at least two primary hydroxyl groups and having an equivalent weight greater than 2,000. Expressed in a different way, the polyols must have an hydroxyl number less than about 28. Hydroxyl number is defined as the number of milligrams of potassium hydroxide required to completely neutralize the hydrolysis product of the fully acylated derivative prepared from one gram of polyol. Mathematically, the hydroxyl number of a compound is equal to 56,100 times the number of hydroxyl groups in the compound divided by the molecular weight of the compound. Preferably, the polyols are diols and have a molecular weight greater than 4,000, preferably about 5,000.

Preferably, the polyether polyol is a condensation product of ethylene oxide and propylene oxide. An especially preferred material is Pluracol Polyol 686, and ABA block copolymer containing about 80% ethylene oxide (A) and 20% propylene oxide (B) manufactured by BASF Wyandotte Corporation. This material is a diol and has a molecular weight of approximately 5,000 and an hydroxyl number of 22.4.

The polyfunctional cross-linking agent is a polyol having at least three primary hydroxyl groups and having an equivalent weight of less than 100. Preferably the cross-linking agent is trimethylol propane, hereinafter TMP. The quantity of cross-linking agent present must be such that the ratio of equivalents of cross-linking agent to equivalents of water present is greater than or equal to one. As indicated above, in polyurethane reaction systems water has an effective equivalent weight of nine; this value must be used in calculating the number of equivalents of water present in the reaction system. Further, there should be a maximum of about 0.35 equivalent of cross-linking agent per 100 parts polyol. When the preferred cross-linking agent TMP is used, there should be a maximum of about 15 parts TMP per 100 parts polyol.

Water is used in the reaction system at a level of between one and two parts per 100 parts polyol.

As is common in all polyurethane reaction systems, catalysts are necessary. Stannous octoate is one of the catalysts used in the instant invention. It is used at a level of from 0.1 to 0.3 part per 100 parts polyol.

The final necessary component for the reaction system of the instant invention is a strong base catalyst. As used in this specification, a strong base catalyst is an inorganic hydroxide such as sodium hydroxide or potassium hydroxide; basic amines are not included within this definition. That is to say, the strong base catalyst must be a non-amine material. Preferably, the strong base catalyst is sodium hydroxide. The strong base catalyst must be present at from about 0.00038 to about 0.00125 equivalent per 100 parts polyol. The preferred sodium hydroxide strong base catalyst must be present at from about 0.015 to about 0.05 part per 100 parts polyol.

Optional components well known to those skilled in the art of flexible polyurethane foam making can be used in the reaction system of this invention. For example, surfactants useful as foam stabilizers may be used. Typical surfactants useful in the instant reaction system include Pluronic L-93, L-121 and P-103, all of which are ethylene oxide-propylene oxide condensates made by BASF Wyandotte Corporation of Wyandotte, Michigan. Other suitable foam stabilizers include the silicone surfactants such as L-532, an organo silicone made by Union Carbide Corporation of New York, N.Y. Pluronic P-103 is a preferred optional foam stabilizer. Foam stabilizers should be present at from about 0.1 to about 1 part per 100 parts polyol.

In order to more fully describe the instant invention, and not by way of limitatiion, the following examples are presented.

EXAMPLE 1

To illustrate a preferred embodiment of the instant invention, a reaction mixture comprising 100 parts Pluracol Polyol 686, 10 parts TMP, 37 parts HDI, 1.3 parts water, 0.15 part stannous octoate, 0.033 part sodium hydroxide, and 1.0 part pluronic P-103 were fed to a standard mixing head at a temperature of 55° C. The mixture exhibited a cream time of 10 seconds and a rise time of 1 minute, 40 seconds. The resulting product after reticulation was tack-free and had a dry specific volume of 18.3 cc per gram.

EXAMPLE 2

Seven samples having levels and ratios of components which fall within the scope of the instant invention were prepared and treated as in Example 1. The compositions of the samples and the results obtained are shown in Table 1. All foam products were satisfactory in terms of light stability, flexibility and freedom from tack. Sample A did exhibit a longer cream time and rise time than desirable, but the final product was satisfactory.

TABLE 1

| SAMPLES | | A | B | C | D | E | F | G |
|---|---|---|---|---|---|---|---|---|
| Pluracol Polyol 686 | pts. | 100 | 100 | 100 | 100 | 100 | 100 | 100 |
| HDI | pts. | 35 | 35 | 35 | 40 | 40 | 35 | 35 |
| TMP | pts. | 9.05 | 9.05 | 9.05 | 13.1 | 9.05 | 9.05 | 9.05 |
| Water | pts. | 1.32 | 1.32 | 1.32 | 1.0 | 1.82 | 1.32 | 1.32 |
| Stannous Octoate | pts. | 0.15 | 0.075 | 0.15 | 0.15 | 0.15 | 0.225 | 0.15 |
| NaOH | pts. | 0.016 | 0.033 | 0.033 | 0.033 | 0.033 | 0.033 | 0.05 |
| Pluronic P-103 | pts. | 1 | 1 | 1 | 1 | 1 | 1 | 1 |
| TMP:Water Ratio | | 1.37 | 1.37 | 1.37 | 2.64 | 1.00 | 1.37 | 1.37 |
| Isocyanate Index | | 107 | 107 | 107 | 107 | 107 | 107 | 107 |
| Cream Time | sec. | 55 | 15 | 15 | 15 | 15 | 10 | 10 |
| Rise Time | sec. | 175 | 90 | 110 | 75 | 105 | 100 | 50 |

TABLE 1-continued

| SAMPLES | | A | B | C | D | E | F | G |
|---|---|---|---|---|---|---|---|---|
| Dry Specific Volume | cc/g | 17.6 | 19.2 | 17.7 | 13.4 | 24 | 18.3 | 17.2 |

EXAMPLE 3

A sample comprising 100 parts Pluracol Polyol 686, 6.92 parts TMP, 2.58 parts water, 43.2 parts HDI, 0.10 part stannous octoate, 0.044 part sodium hydroxide, and 1 part Ploronic P-103 was formed and treated as in Example 1. While the Isocyanate Index of this sample is 107 and is in the prescribed range, the ratio of equivalents of TMP to equivalents of water is only 0.54 and is outside the prescribed range. The foam collapsed almost immediately after forming. A satisfactory sample of flexible polyurethane foam was not formed.

EXAMPLE 4

In order to show that the Isocyanate Index must be below 110, the samples shown in Table 2 were formed and prepared as in Example 1. Samples H and J, having Isocyanate Indicies of 146 and 113 respectively, burned spontaneously during initial curing. Sample K having an Isocyanate Index of 109, did not burn and formed a flexible, light stable polyurethane foam.

EXAMPLE 5

In order to demonstrate the necessity of the strong base catalyst, the samples indicated in Table 3 were prepared and were treated as in Example 1. In order to make a foam at all, it was necessary to adjust the levels of the components so that in Samples L, M, N, and P the TMP:water ratios and/or the Isocyanate Indices were outside the critical ranges for strong base catalized reactions. Samples L, M, N and P were exceedingly tacky. Samples M and Q were too brittle to be reticulated. It is apparent from this example that a strong base catalyst is a necessary component of the reaction system of this invention.

TABLE 2

| SAMPLES | | H | J | K |
|---|---|---|---|---|
| Pluracol Polyol 686 | pts. | 100 | 100 | 100 |
| HDI | pts. | 50 | 38 | 37.3 |
| TMP | pts. | 9.0 | 9.0 | 9.0 |
| Water | pts. | 1.5 | 1.5 | 1.5 |
| Stannous Octoate | pts. | 0.15 | 0.15 | 0.15 |
| NaOH | pts. | 0.025 | 0.025 | 0.025 |
| Pluronic P-103 | pts. | 1.0 | 1.0 | 1.0 |
| Isocyanate Index | | 146 | 113 | 109 |

TABLE 3

| SAMPLES | L | M | N | P | Q |
|---|---|---|---|---|---|
| Pluracol Polyol 686 | 100 | 100 | 100 | 100 | 100 |
| HDI | 42.2 | 42.2 | 34.8 | 34.8 | 37.5 |
| TMP | 8.0 | 8.0 | 7.0 | 7.0 | 10.0 |
| Water | 2.0 | 2.0 | 1.77 | 1.77 | 2.0 |
| Stannous Octoate | 1.0 | 2.0 | 0.50 | 1.5 | 0.75 |
| NaOH | — | — | — | — | — |
| Pluronic P-103 | 0.2 | 0.6 | 1.0 | 1.0 | 0.25 |
| TMP:Water Ratio | 0.81 | 0.81 | 0.80 | 0.80 | 1.0 |
| Isocyanate Index | 113 | 113 | 105 | 105 | 92 | catalyst is a necessary component of the reaction system of this invention.

The flexible, light stable polyurethane foams of this invention find application in many products. They can, for example, be used as padding in furniture, athletic equipment, and automobiles. They are also useful in products requiring absorbative capacity. One particularly significant use of the flexible polyurethane foams of this invention is in the catamenial tampons described by Schaefer in U.S. Pat. No. 3,815,601 which issued June 11, 1974, and which is incorporated herein by reference.

What is claimed is:

1. A flexible polyurethane foam obtained from the reaction of an aliphatic diisocyanate and a polyether polyol while in addmixture with a polyfunctional cross-linking agent, stannous octoate catalyst, an inorganic hyroxide strong base catalyst and water wherein:
    a. said polyether polyol has at least two primary hydroxyl groups and a hydroxyl number less than about 28;
    b. said polyfunctional cross-linking agent has at least three primary hydroxyl groups and an equivalent weight of less than about 100;
    c. the ratio of equivalents of said polyfunctional cross-linking agent to equivalents of water is equivalent to or greater than 1;
    d. the Isocyanate Index of the reaction system is less than about 110;
    e. water is present at from about one to about two parts per 100 parts polyether polyol;
    f. the inorganic hydroxide strong base catalyst is present at from about 0.00038 to about 0.00125 equivalent per 100 parts polyether polyol;
    g. the stannous octoate is present at a level of from 0.1 to 0.3 parts per 100 parts polyol; and
    h. the maximum amount of cross-linking agent is about 0.35 equivalents of said cross-linking agent per 100 parts polyol.

2. The polyurethane foam of claim 1 wherein said polyether polyol is a diol having a molecular weight greater than 4,000.

3. The polyurethane foam of claim 1 wherein said polyfunctional cross-linking agent is trimethylol propane.

4. A flexible polyurethane foam prepared from a reaction system comprising 100 parts polyether polyol, 37 parts hexamethylene diisocyanate, 10 parts trimethylol propane, 1.3 parts water, 0.15 part stannous octoate, 0.033 part sodium hydroxide, and 1.0 part foam stabilizing surfactant wherein said polyether polyol is a primary diol having a molecular weight of about 5,000.

5. A process for making polyurethane foams which comprises reacting an aliphatic diisocyanate and a polyether polyol in the presence of a polyfunctional cross-linking agent, stannous octoate catalyst, an inorganic hydroxide strong base catalyst and water wherein:
    a. said polyether polyol has at least two primary hydroxyl groups and a hydroxyl number less than about 28;
    b. said polyfunctional cross-linking agent has at least three primary hydroxyl groups and an equivalent weight of less than about 100;
    c. the ratio of equivalents of said polyfunctional cross-linking agent to equivalents of water is equal to or greater than 1;
    d. the Isocyanate Index of the reaction system is less than about 110;
    e. water is present at from about one to about two parts per 100 parts polyether polyol;

f. the inorganic hydroxide strong base catalyst is present at from about 0.00038 to about 0.00125 equivalent per 100 parts polyether polyol;

g. the stannous octoate is present at a level of from 0.1 to 0.3 parts per 100 parts polyol; and h. the maximum amount of cross-linking agent is about 0.35 equivalents of said cross-linking agent per 100 parts polyol.

6. The process of claim 5 wherein said polyether polyol is a diol having a molecular weight greater than 4,000.

7. The process of claim 5 wherein said cross-linking agent is trimethylol propane.

8. A process for making flexible polyurethane foams which comprises reacting 100 parts polyether polyol with 37 parts hexamethylene diisocyanate in the presence of 10 parts trimethylol propane, 1.3 parts water, 0.15 part stannous octoate, 0.033 part sodium hydroxide, and 1.0 part foam stabilizing surfactant wherein said polyether polyol is a primary diol having a molecular weight of about 5,000.

* * * * *